United States Patent

[11] 3,588,079

[72] Inventors William D. Addy
 Catonsville;
 Forrest A. Wessells, Baltimore, Md.
[21] Appl. No. 763,522
[22] Filed Sept. 30, 1968
[45] Patented June 28, 1971
[73] Assignee W. R. Grace & Co.
 New York, N.Y.

[54] NEGATIVE MOUNTING PLATE
 1 Claim, 6 Drawing Figs.
[52] U.S. Cl. .................................................. 269/21,
 355/73, 355/76
[51] Int. Cl. ...................................................... B25b 11/00
[50] Field of Search ........................................... 269/21;
 248/362, 363; 355/73, 76

[56] References Cited
 UNITED STATES PATENTS
 1,778,027 10/1930 Herriott ....................... 248/363X
 3,180,608 4/1965 Fischer ........................ 248/363
 3,359,879 12/1967 Hamlin ........................ 248/363X
 3,421,814 1/1969 Burnham ..................... 355/76X
 3,455,634 7/1969 Guffon ........................ 355/76X
 2,317,348 4/1943 Wekeman ................... 248/363
Primary Examiner—Robert C. Riordon
Attorneys—Eugene M. Bond and Kenneth E. Prince ABSTRACT: The invention disclosed is for a transparent plate having channeling on one surface thereof and means for maintaining a vacuum in the channeling when a transparency film is mounted thereover. The present transparent plate usefully serves as a mount for a transparency film without any additional means which may interfere with further developing, processing, or reproduction thereof.

PATENTED JUN 28 1971

INVENTORS
WILLIAM D. ADDY
FORREST A. WESSELLS

BY
Eugene M. Bond
ATTORNEY

NEGATIVE MOUNTING PLATE

This invention relates to a transparent plate having channeling on one surface thereof and means for maintaining a vacuum in the channeling when a transparency film is mounted and secured in position thereover.

Heretofore, numerous means have been devised for retaining transparency film such as a photographic negative to a plate for reproduction, processing, the the like. These means include support plates whereon the film is merely layered over a transparent plate, support plates having clamping means to hold the film physically to the plate member, as well as other related means such as lamination of a film between adjoining plates. These methods, however, have resulted in units of rather limited use and in some instances the units are complex which typically interfere with processing of the film while failing to provide versatility and clarity should reproduction be desired. These defects have also existed when using vacuum plates such as is disclosed in U.S. Pat. Nos. 2,317,348, 3,222,051 and 3,294,392. Such previous vacuum plates have failed to solve the problem of mechanical units in that these prior vacuum plates remain complex and have little versatility when operable. It has now been found that by the practice of the present invention, a transparent plate having a channel area removed from one surface in combination with vacuum transport or conduit means usefully serves to provide a device for retaining a transparency thereover.

Generally stated, the present invention provides a transparent plate for mounting a transparency film which plate includes a transparent foundation plate having a channel section removed from a substantially flat surface thereof and forming a periphery with intermediate and corner portions, vacuum transport or conduit means passing through the plate and approximately centrally disposed within the width of the intermediate portions of the removed channel section, corner vacuum transport or conduit means passing through the plate and disposed near the apex of corner portions of the removed channel section, means for interconnecting the several vacuum transport or conduit means on a side opposite the channel section, and means for providing a vacuum to the interconnected vacuum transport or conduit means.

The practice of the present invention will become more apparent from the description of the drawing wherein like elements are referred to by similar numerals throughout the several views in which.

Figure 1:
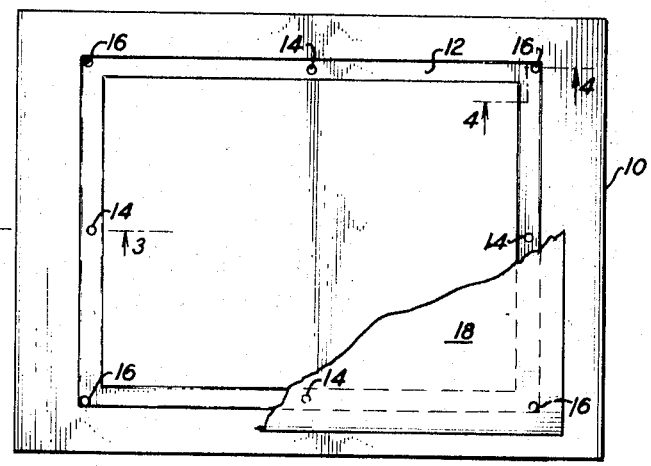
FIG. 1 is a top elevational view of a transparent plate of the present invention having a partially broken transparency film mounted in position.

Referring to FIG. 1, there is illustrated transparent mounting plate 10 having channel section 12 removed from one substantially flat surface thereof in a width of about three-eighths to about five-eighths inch and a depth of about 1 to about 5 mils. It is found that when greater or lesser amounts of material are removed, ineffective mounting of a transparency typically results. Desirably, the surface from which such a channel section is removed is substantially flat such that a film to be retained thereon is effectively held in position without wrinkling of the film or leakage of vacuum from within the channel when a transparency is positioned thereover. The transparent plate may be formed of a material such as glass although it is recognized that additional materials may be employed to form the transparent plate including plastic materials or the like.

Disposed intermediate the width of the central portions of a channeled length is intermediate vacuum transport or conduit means 14 within channel section 12 positioned as illustrated for retention of an effective vacuum within the channeling as opposed to near one or another side edge thereof. It is recognized that any number of such intermediate vacuum transport means may be included along the length of the channel section depending upon the particular length or width measurements of the channel legs forming a periphery on the plate.

Positioned at the corner portions of channel section 12 is vacuum transport or conduit means 16 illustrated disposed near the far apex of the corner portion. It is found that such positioning effectively provides a vacuum with simple elements of construction when a transparency film is mounted and secured in position over the channel section.

Transparency film 18 may be retained on the surface of transparent plate 10 through vacuum developed within channel section 12. The various vacuum transport means 14 and 16 respectively usefully serve to effectively and efficiently maintain retention of the transparency film. The particular size of a transparency film which may be secured to transparent plate 10 is not limited since it is recognized that a transparency film of a size smaller than the area of that channel in the surface of plate 10 may be retained to the plate by using a larger clear sheet of transparent film positioned over the smaller transparency film and retained to the plate by vacuum developed in the channel section. The transparency film is intended to include those having an image bearing, line or halftone; stencil, positive or negative film consisting solely of substantially opaque and substantially transparent areas desirably wherein the opaque areas are substantially of the same optical density.

Figure 2:
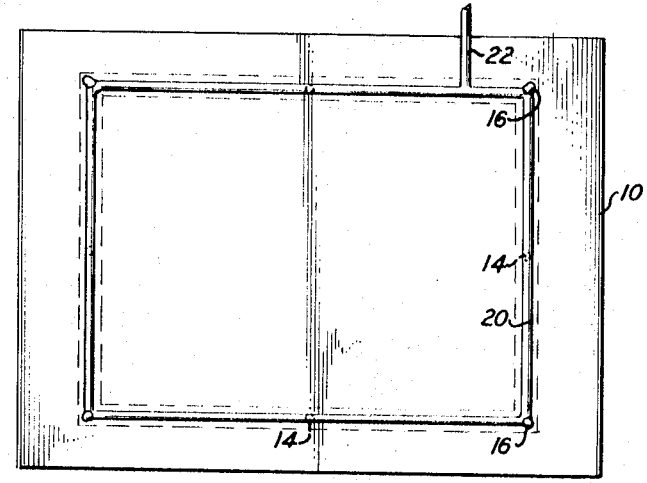
FIG. 2 is a rear elevational view of a transparent mounting plate of the present invention.

FIG. 2 illustrates a convenient vacuum transport system for interconnecting vacuum transport means 12 and 14 and includes a series of joining vacuum transport elements 20 which may terminate into a connecting element to a vacuum supply 22 which receives vacuum from a conventional vacuum developing source, not shown.

Figure 3:
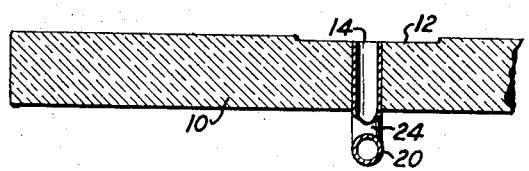
FIG. 3 is a partial side elevation taken along section lines 3—3 of FIG. 1 and illustrating a vacuum transport means passing through the plate and approximately centrally disposed within the width of an intermediate portion of the channel section.

FIG. 3 further illustrates how vacuum transport member 14 may be positioned approximately intermediate the width of a channel section 12 and appears as tubing 24 disposed through transparent plate 10 and joining vacuum transport elements 20. Desirably, tubing 24 appears flush with the lower surface of the channel section 12 as illustrated in FIG. 3.

Figure 4:
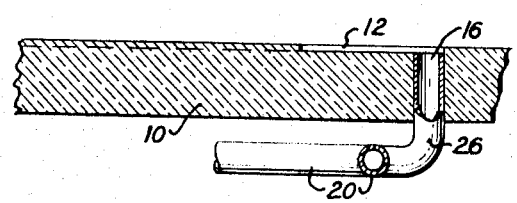
FIG. 4 is a partial side elevational view taken along section lines 4—4 of FIG. 1 and illustrating a corner vacuum transport means passing through the plate and disposed near the apex of a corner portion of the channel section.

FIG. 4 illustrated vacuum transport means 16 disposed at a corner section and typically at the apex of the far corner of the channel section over which a film is to be mounted. In similar fashion to that of vacuum transport means 14 of FIG. 3, vacuum transport means 16 is substantially flush with the lower channel surface of channel 12 as illustrated in FIG. 4 wherein the vacuum transport means appears as tubing 26 disposed through transparent plate 10 and joining vacuum transport elements 20 also illustrated as tubing vacuum channeling elements.

The means by which the vacuum channeling elements are united or joined may be varied providing that a sufficient degree of vacuum is retained within the channel section when a transparency film is positioned thereover. Thus, various vacuum connecting elements may be employed to join the vacuum transport elements which elements may appear either as vacuum rated plastic tubing, metal tubing properly joined to retain a vacuum, or the like.

The channel section may be of my configuration in addition to the rectangular configuration generally illustrated in the FIGS. provided the perimeter of the channeled area is beyond that of the area of the image bearing areas of the transparency to be processed or duplicated. Thus, the configuration of channeling may appear in any desirable pattern such as for example, a circular configuration in which case the corner mounted vacuum transport member 16 may be conveniently disposed such as at alternating intervals sufficient to retain the vacuum along the circular channel section and effectively retain a transparency film to the surface of the transparent plate.

When glass is employed as the transparent plate, the channel section may be conveniently formed by sand blasting, etching or any other suitable means which effectively removes a small portion and thus forms a vacuum channel within one surface of the plate. Regardless of the particular material employed for forming the transparent plate, is found that the depth of the channel is only that sufficient to retain a vacuum and feed not be extensive in which instance excess vacuum may be employed with no added benefit. Thus, a depth of about 1 to about 5 mils is preferred. The width of the channel is only sufficient to retain the film as a mounted layer over the plate and need not be in excess in which instance a transparency film may be overly drawn within the channel and thereby presenting an undesirable curvature or wrinkling to the film in the area of the vacuum channeling. Thus, the width of the channel is preferably about three-eighths to about five-eighths inch.

The transparency film to be mounted over the present transparent plate may be formed of any material which may be retained by vacuum thereover and having little or nor air permeability when mounted. The transparency film may be applied by simply positioning such a film over the area of the vacuum channeling and, if desired, a squeegee may be employed for removing any air retained between the film and the surface of the transparent plate. By this practice; the transparency film is mounted essentially in total contact with the plate within that area of defined by the vacuum channeling without having the film positioned over air pockets. This practice further avoids any error of reproduction resulting by having a distorted film applied over a plate surface.

Figure 5:
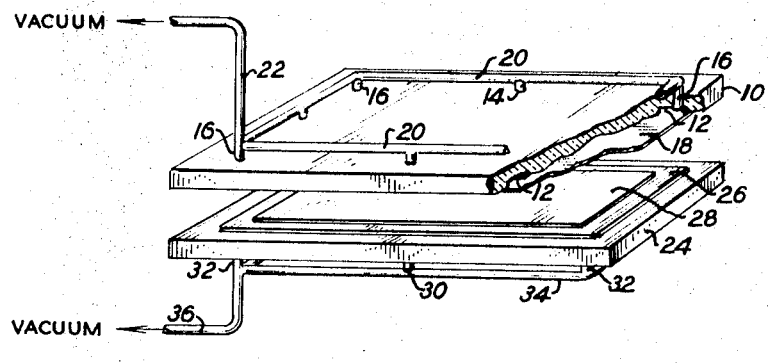
FIG. 5 is a partial perspective view illustrating relative positioning of a mounted transparency over a supported composition layer to be exposed.

One particular use of the transparent plate of the present invention is illustrated in FIG. 5. Plate 10 having vacuum section 12 removed from one surface thereof supports transparency film 18 by means of intermediate vacuum tubes 14 and corner vacuum tubes 16 to which vacuum is supplied by vacuum system 20 received from vacuum line 22. Plate 10 is positioned over metal support 24 having composition support film 26 thereon. Disposed on composition support film 26 is composition layer 28. Composition support film 26 may be retained to metal support 24 by intermediate vacuum transport elements 30 and corner vacuum transport elements 32 interconnected by vacuum system 34 receiving vacuum through tube 36 from a vacuum source not shown.

Figure 6:
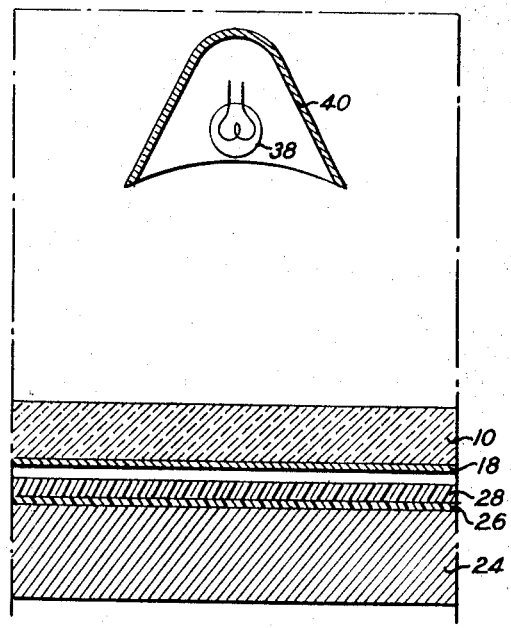
FIG. 6 illustrates as a partial side elevational view of the exposing of a composition layer by light or actinic radiation projected through a transparency and intermediate air space.

The present transparent plate is especially useful for retaining a negative transparency film in close noncontacting position relative to a photocurable composition such as is illustrated in FIG. 6. In FIG. 6, transparent plate 10 having vacuum elements as described herein supports transparency film 18 in close noncontacting position relative to photocurable composition 28 on composition support 26 retained to metal plate 24 as described with regard to FIG. 5. Suitable light source 38 such as one projecting actinic radiation directed through transparent 10 and negative film 18 photocures composition 28 only in desired image areas by light differentially screened through the negative. The nonimage areas, remaining uncured, may be removed as desired leaving image areas which may serve as a printing medium if desired.

When the present transparent plate is used in preparation of printing plates, intimate contact between a negative or image bearing transparency and the surface forming the printing plate is eliminated. Thus, solid relief printing plates may be prepared simply, in short time, and with commercial acceptability from a liquid photocurable composition disposed on a solid flexible support.

The present transparent plate further provides a useful means which permits near contact reproduction within distortion which may otherwise result in contact reproduction methods. By maintaining an air space of a magnitude of about 1 to about 100 mils intermediate negative film 18 and photocurable composition 28, near contact sharp reproduction is available without significant defects resulting in the reproduced plate. Sharp reproduction without significant defects is desired especially, in preparation of printing plates as is the advantage of a simple reproduction system which may be performed simply and accurately without requiring highly skilled personnel.

A useful photocurable composition for preparing printing plates by using the transparent plate of the present invention is that set out in a copending application having U.S. Ser. No. 674,773, filed Oct. 12, 1967, now abandoned, assigned to the same assignee hereof and incorporated by reference herein. In said application, a photocurable polymeric composition is disclosed consisting of a polyene containing at least two unsaturated carbon to carbon bonds per molecule and a photosensitizer, such as benzophenone.

After the transparency film has been employed in preparing a printing plate as described, it may be removed from the transparent plate simply by terminating the vacuum upon which instance the film merely may be lifted from the surface of the transparent plate with no great physical effort. The present invention thus accomplishes great utility in having a readily removable means for mounting a negative transparency and avoids the use heretofore of adhesively applying a negative transparency to a plate.

It will be apparent from the foregoing that the present transparent plate provides great versatility, great accuracy in reproducing transparency films, and simplicity of construction thus affording use in conventional apparatus without any degree of modification.

The various elements of the present transparent plate, unless otherwise indicated, may be secured to adjoining elements be any suitable means. In addition, auxiliary support and reinforcement members may be included as part of the plate where required.

Although a preferred embodiment of the invention has been illustrated herein, it is to be understood various changes and modifications may be made in the construction and arrangement of elements without departing from the spirit of this invention.

We claim:

1. A plate for mounting a transparency film over a channel section which comprises a transparent foundation plate having a substantially flat surface, a single channel section disposed in said substantially flat surface of said plate and forming a periphery with intermediate and corner portions, said channel section having a width of about three-eighths to about five-eighths inch and a depth of about 1 to about 5 mils, conduit means passing through said foundation plate and approximately centrally disposed within the width of intermediate portions of the channel section, corner conduit means passing through the foundation plate and disposed near each apex of the corner portions of the channel section and means for interconnecting the several conduit means on a side opposite the channel section.